US009244827B2

(12) United States Patent
Kim et al.

(10) Patent No.: US 9,244,827 B2
(45) Date of Patent: Jan. 26, 2016

(54) STORE ADDRESS PREDICTION FOR MEMORY DISAMBIGUATION IN A PROCESSING DEVICE

(71) Applicants: Ho-Seop Kim, Portland, OR (US);
Robert S. Chappell, Portland, OR (US);
Choon Y. Soo, Bayan Lepas (MY);
Srikanth T. Srinivasan, Portland, OR (US)

(72) Inventors: Ho-Seop Kim, Portland, OR (US);
Robert S. Chappell, Portland, OR (US);
Choon Y. Soo, Bayan Lepas (MY);
Srikanth T. Srinivasan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 304 days.

(21) Appl. No.: 14/036,591

(22) Filed: Sep. 25, 2013

(65) Prior Publication Data

US 2015/0089186 A1    Mar. 26, 2015

(51) Int. Cl.
*G06F 12/02* (2006.01)
*G06F 9/38* (2006.01)

(52) U.S. Cl.
CPC ............ *G06F 12/0215* (2013.01); *G06F 9/383* (2013.01); *G06F 9/3834* (2013.01); *G06F 9/3842* (2013.01)

(58) Field of Classification Search
None
See application file for complete search history.

(56) References Cited

U.S. PATENT DOCUMENTS

| 5,615,350 | A | 3/1997 | Hesson et al. |
| 5,666,506 | A | 9/1997 | Hesson et al. |
| 5,781,752 | A | 7/1998 | Moshovos et al. |
| 6,108,770 | A | 8/2000 | Chrysos et al. |

OTHER PUBLICATIONS

Gonzalez, J. et al., "Speculative Execution via Address Prediction and Data Prefetching", proceedings of the 1997 international conference on supercomputing. Vienna, Jul. 7-11, 1997; [Proceedings of the International Conference on Supercomputing], New York, ACM, US, vol. Conf. 11, Jul. 7, 1997, pp. 196-203, XP000755258, ISBN: 978-0-89794-902-9.
Reinman G. et al., "Predictive Techniques for Aggressive Load Speculation", MICRO-31. Proceedings of the 31st. Annual ACM/IEEE International Symposium on Microarchitecture. Dallas, TX Nov. 30-Dec. 2, 1998; [Proceedings of the annual ACM/IEEE International Symposium on Microarchitecture], Los Almitos, CA: IEEE Comp. Soc., Nov. 30, 1998, pp. 127-137, XP010318243, DOI: 10.1109/Micro. 1998. 742775 ISBN: 978-0-8186-8609-2.
European Patent Search Report for International Application No. EP14184266.6, mailed Oct. 20, 2014, 5 pages.

*Primary Examiner* — Kevin Verbrugge
(74) *Attorney, Agent, or Firm* — Lowenstein Sandler LLP

(57) ABSTRACT

A processing device implementing store address prediction for memory disambiguation in a processing device is disclosed. A processing device of the disclosure includes a store address predictor to predict an address for store operations that store data to a memory hierarchy. The processing device further includes a store buffer for buffering the store operations prior to completion, the store buffer to comprise the predicted address for each of the store operations. The processing device further includes a load buffer to buffer a load operation, the load operation to reference the store buffer to, based on the predicted addresses, determine whether to speculatively execute ahead of each store operation and to determine whether to speculatively forward data from one of the store operations.

24 Claims, 13 Drawing Sheets

US 9,244,827 B2

STORE ADDRESS PREDICTION FOR MEMORY DISAMBIGUATION IN A PROCESSING DEVICE

TECHNICAL FIELD

The embodiments of the disclosure relate generally to processing devices and, more specifically, relate to store address prediction for memory disambiguation in a processing device.

BACKGROUND

When a load-from-memory operation (referred to as a "load micro-operation" or "load uop" in certain processor nomenclatures) is dispatched for execution in a pipelined processor, it typically checks against older, in-flight, store-to-memory operations ("store uops") in a store buffer of the processor. This check is performed because there may be older store uops in the store buffer with a matching memory address to the load uop that have not yet written their data into a memory hierarchy that is accessed by the processing device. If there is such a matching store, the load uop either, in general, forwards from the youngest older matching store uop or waits until the store uop is completed. This address checking process against older store uops for possible dependency is commonly referred to as memory disambiguation.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
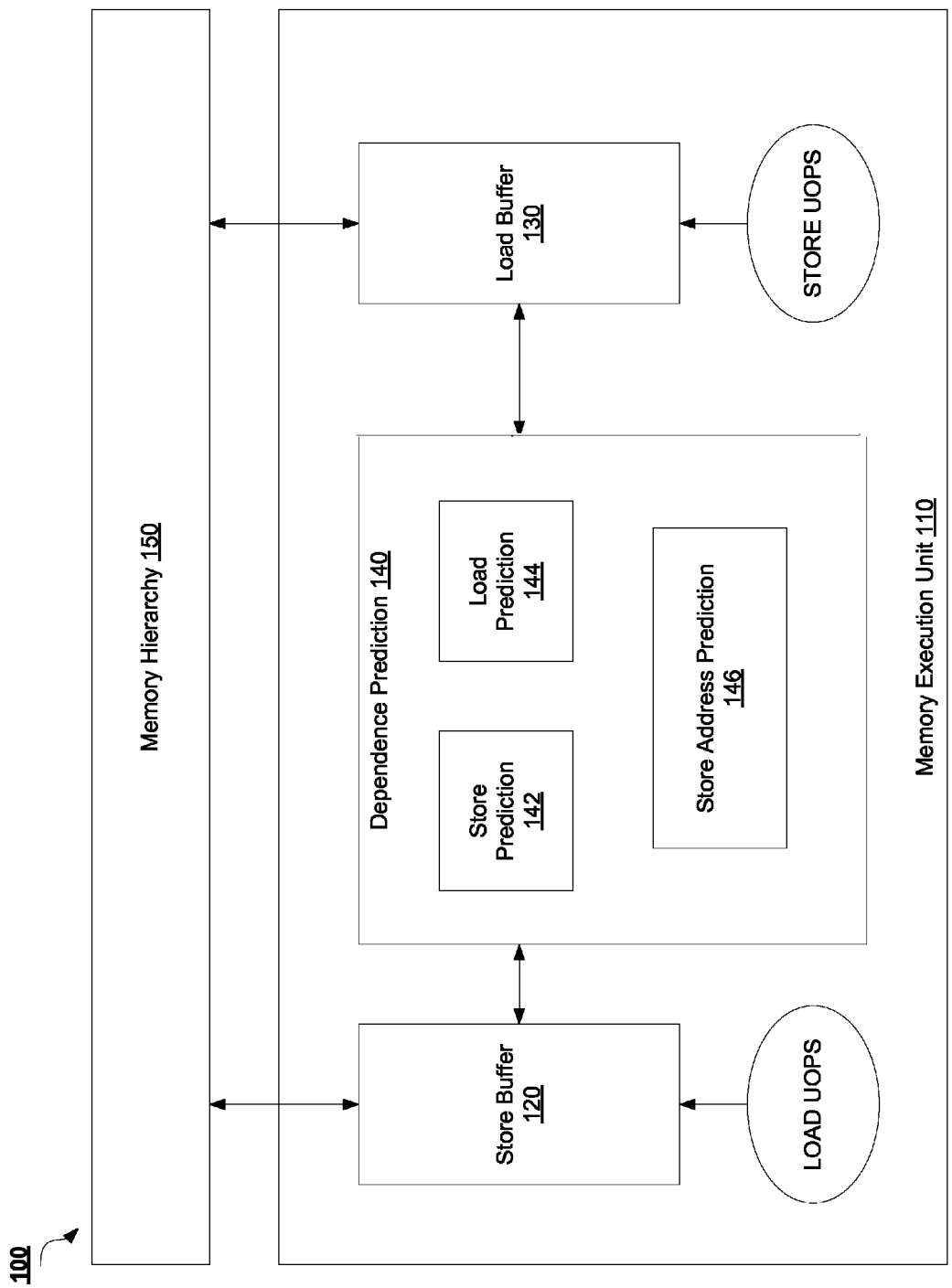
FIG. 1 illustrates an exemplary architecture in accordance with which implementations may operate.

Embodiments of the disclosure implement techniques to provide store address prediction for memory disambiguation in a processing device. Implementations of the disclosure provide a store address predictor to predict store address of store operations ("micro-operations" or "uops") prior to the actual calculation of the store address. This predicted store address may be utilized by load uops that are younger than the store uop (e.g., the load uop occurs before the store uop in a logical order of the program and thus may depend on the store address of the store uop) for speculative forwarding of data or for making decisions on whether the load uop can skip the store uop. Implementations of the disclosure also provide a verification solution to determine whether the prediction store address is valid, and thus whether the load uop should be rolled back and the processor pipeline flushed upon occurrence of any store address mispredictions.

If a store's address has not been calculated yet by the time of a load uop's dispatch, the load uop would have to conservatively consider the store's address as potentially matching and wait until the store address is resolved. To reduce performance impact of those store address-induced blocks, recent solutions employ load-based and/or store-based memory dependence prediction mechanisms. For load-based memory dependence prediction, the predictor monitors load execution and records if there was a matching store. If not, later such loads are allowed to speculatively treat those stores whose address has not been resolved yet as non-match. Many times this leads to faster completion of loads as they do not block on those stores without valid address yet. Stores should check against the speculatively-completed logically-younger loads to verify if the prediction was indeed correct. The store-based memory dependence prediction mechanism is an alternative scheme that trains and provides memory disambiguation prediction per store. Store-based prediction can be used either as a complementary predictor alongside the load-based dependence predictor or replace it as a stand-alone predictor.

The store address prediction for memory disambiguation of implementations of the disclosure improves current load-based and store-based dependence predictors by providing additional information (e.g., the predicted store address) to enhance performance of store and load-based operation prediction. The existing load-based and store-based dependence predictor solutions are usually limited due to their prediction schemes being either all or nothing. This "all or nothing" refers to a load uop, under the previous prediction schemes, either skipping all stores in a store buffer having unknown addresses (e.g., address not yet calculated) or the load uop not skipping any store uops with unknown addresses. Furthermore, the existing solutions are often limited in that they do not allow speculative forwarding from store uops with unknown addresses. The previous dependence predictors make the load uop block the store uop, even if the store uop's data is available, but its address is not valid yet. In comparison, the store address prediction for memory disambiguation of the disclosure allows a fine-grained approach to load uops skipping store uops in the store buffer, and allows load uops to speculatively forward data from store uops based on the predicted address provided by the store address predictor of implementations of the disclosure.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the following embodiments are described with reference to a processor, other embodiments are applicable to other types of integrated circuits and logic devices. Similar techniques and teachings of embodiments of the disclosure can be applied to other types of circuits or semiconductor devices that can benefit from higher pipeline throughput and improved performance. The teachings of embodiments of the disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

FIG. 1 illustrates an exemplary architecture 100 in accordance with which implementations may operate, where the architecture 100 is a processing device (e.g., processor and/or CPU) implementing store address prediction for memory disambiguation in a processing device. Architecture 100 may include a memory execution unit 110 and a memory hierarchy 150. Memory execution unit 110 may be part of an execution engine of a processing device providing support for memory operations ("micro-operations" or "uops") executed by the processing device. The memory uops may include either load uops that load data from the memory hierarchy 150, or store uops that store data to the memory hierarchy 150. Although not specifically illustrated, the memory hierarchy 150 may include multiple cache levels (e.g., a L1 cache, L2 cache, l3 cache, etc.) and a system memory.

One implementation of the disclosure provides store address prediction for memory disambiguation by the memory execution unit 110. As discussed above, memory disambiguation refers to an address checking process for load uops against older store uops (i.e., in the logical program order) for possible dependency. Store address prediction monitors a store uop's address pattern and provides a predicted address for the store uop (before the actual store address is calculated and validated) if a stable pattern is found. This predicted address may be used by the load uops for store forwarding purposes to increase efficiency of the memory execution unit 110.

A dependence prediction component 140 may be implemented within the memory execution unit 110 in accordance with one implementation of the disclosure. Specifically, the dependent prediction component 140 includes store prediction component 142, load prediction component 144, and store address prediction component 146. Store dependence prediction component 142 may implement store-based prediction techniques for memory disambiguation, while load dependence prediction component 144 may implement load-based prediction techniques for memory disambiguation. Dependence prediction component 140 may also include is a store address prediction component 146 for implementing store address prediction for memory disambiguation according to implementations of the disclosure, described further below with respect to FIG. 2.

Also illustrated in FIG. 1 is a store buffer 120 maintaining entries for pending store uops and a load buffer 130 maintaining entries for pending load uops. The store uops, when completed, store data to the memory hierarchy 150 and the load uops, when completed, load data from the memory hierarchy 150.

Figure 2:
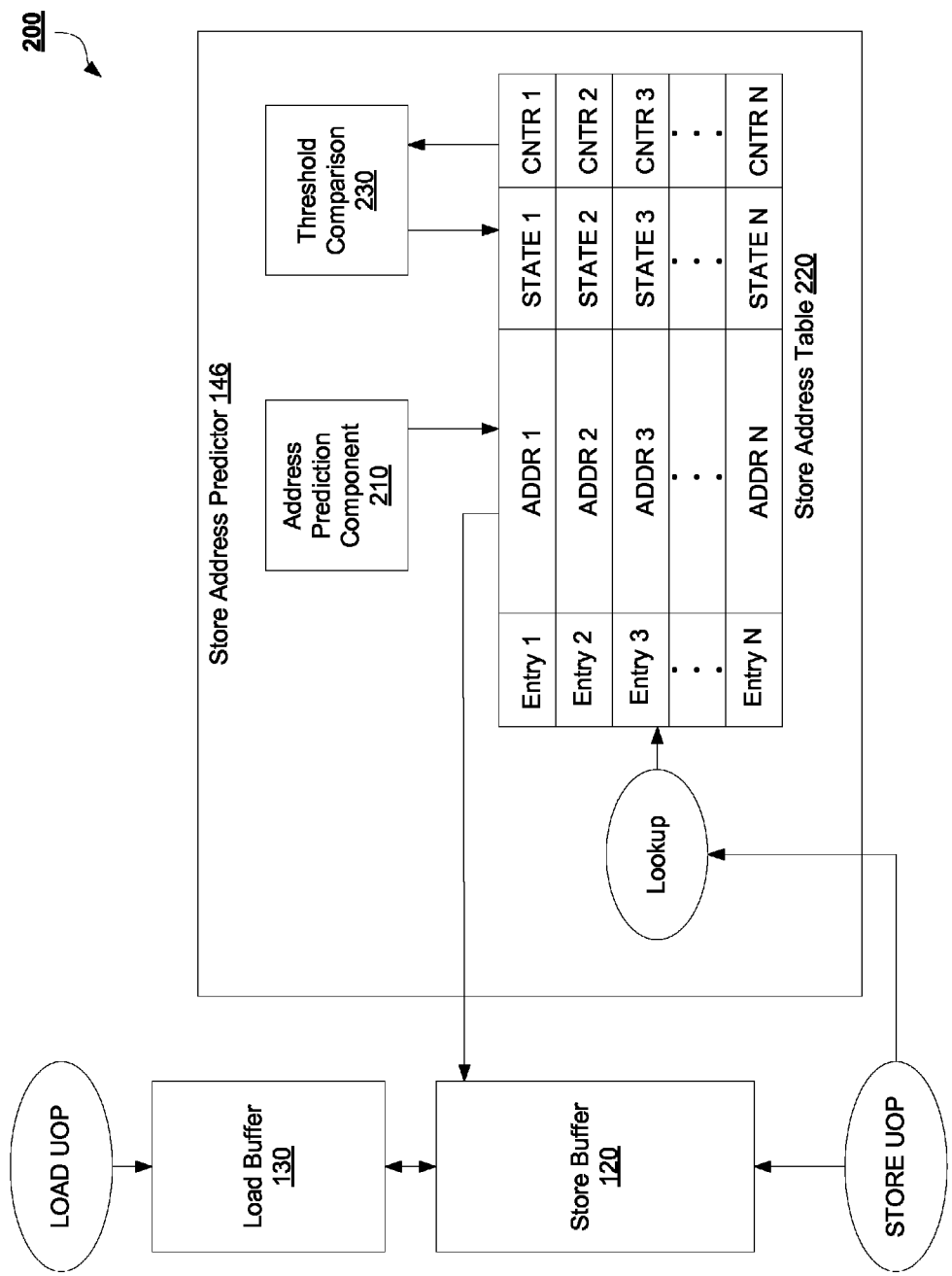
FIG. 2 is a block diagram illustrating a store address prediction architecture in which an implementation of the disclosure may operate.

FIG. 2 is a block diagram illustrating a store address prediction architecture 200 in which an implementation of the disclosure may operate. Architecture 200 includes store address predictor 146, which is the same as its counterpart described with respect to FIG. 1. In addition, store buffer 120 and load buffer 130 are also part of architecture 200, and may be the same as their counterparts described with respect to FIG. 1.

Store address predictor 146 may include an address prediction component 210, a store address table 220, and a threshold comparison component 230. When a store uop is decoded and interpreted as a store instruction, a new entry in the store buffer 120 is allocated. In one implementation, as part of the store uop entry allocation in the store buffer 120, it is determined whether a store address is predicted for the store uop's instruction address (e.g., the "instruction pointer" (IP) or "program counter" of the processing device).

In one implementation, the store address table 220 is a content addressable memory (CAM) array that is indexed by each store uop's IP. This may be known as a "tagged" scheme. As part of entry allocation in the store buffer 120, the store uop looks up the store address table 146 with the store uop's IP to obtain an address prediction for the store uop.

In another implementation, a subset of the IP address is used to index the store address table 220. This may be known as a "tagless" scheme. For example, the first eight bits of the IP address may be used as the index (e.g., IP[7:0] to index into 256-entry store address table). The number of bits to use from the IP address may be selected based on the size of the store address table 220. Although implementations of the disclosure may discuss utilizing the tagged scheme, other implementations, such as the tagless scheme, may also be utilized. In one implementation, the lookup is augmented with a hashing algorithm to reduce predictor aliasing.

The store address table 220 includes entries for various indexes. Each entry may include, but is not limited to, the IP (tagged scheme), a predicted store address for the IP, an entry state, and a counter. The store address predicted for an IP may be determined by address prediction component 210 of the store address predictor 146. Address prediction component 210 may implement various prediction logic schemes for store address prediction. One example prediction logic scheme analyzes history of store addresses calculated for an IP, and predicts a next store address based on a determined pattern exhibited by the history. For instance, a stride (e.g., a distance separating elements in memory) between store addresses in a history of the IP may be calculated and used for store address prediction.

An entry state for an entry in the store address table 220 may be a bit or flag set to indicate whether address prediction for the IP should be implemented or not. The entry state may be set to allow predicted user by the store buffer when it is determined that the predicted address is in a stable state. For example, the predicted address for an IP may be in a stable state when a constant stride is detected. When the entry in the store address table 220 is initialized or being trained, the entry state may be set to suppress prediction.

The counter value stored in the store address table 220 entries may track misprediction of the predicted address for an entry. Each time a predicted store address is found to be incorrect, the counter value is incremented. Threshold comparison component 230 determines whether the counter value for a store address table 220 entry has reached a specified threshold. If so, it sets the entry state for that entry to suppress prediction (e.g., the predicted address for an IP is not to be used by the store buffer) until such time as a stable predicted store address can be determined.

When the store uop entry is allocated in the store buffer 120, a predicted address from the store address table 220 may be written to the corresponding store buffer 120 entry indexed by the store buffer's ID as long as the entry state of the corresponding store address table 220 entry allows prediction. Consequently, when a load uop dispatches that is younger (in terms of logical program order) than the store uop, this younger load uop can check against the store uop in the store buffer (and against any other older store uops in the store buffer).

The younger load uop can utilize the speculative address in the store buffer 120 for purposes of skipping the older store uops (e.g., non-matching addresses condition) or speculatively forwarding the data from the older store uops. This allows loads to avoid unnecessarily blocking on such stores. If a load uop skips over an older store uop, the load uop is marked for the speculative skip (e.g., in the load buffer 130) so that the load uop can be verified later by the store uop. If the load uop forwards from a store with a speculative address (e.g., a match condition), the store uop's store buffer 120 ID is recorded in the load buffer 130 for later verification. This store buffer ID written to the load buffer entry may be referred to as the speculatively-forwarded store buffer ID (SB ID) herein. If the load uop and the store uop have matching addresses (using the speculative address of store uop), but the store uop data is not "forwardable" (e.g., store data is not ready yet or alignment of store and load addresses does not allow forwarding, etc.), the load uop may behave as if store uop does not have a speculative address.

In one implementation, when the store uop's address is calculated and written to its store buffer 120 entry, it is compared against the speculative address in the entry to determine if the address prediction was correct. The corresponding entry state in the store address table 120 may be changed according to the prediction result. As discussed above, if a misprediction occurs, the counter value for the store address table entry is incremented. If a number of mispredictions reaches the state transition threshold (e.g., could be as small as 1), the entry state is changed to suppress prediction.

The calculated store address may also be compared against younger load uops in the load buffer 130 to verify if the memory disambiguation predictions were correct. In some embodiments, load-based dependence prediction (e.g., load predictor 144 from FIG. 1), or store-based prediction (e.g., store prediction 142 from FIG. 1) if in place too, may perform the same address match for their prediction verification. In such configurations, both prediction mechanisms can share the store address table 120 match over the load buffer 130.

When the store uop calculates its address, it also checks against the load buffer 130 for completed load uops that may have skipped over unknown store uops based on the prediction. The load buffer 130 has its own address that is the load uop address that can be used for address comparison. If there is a hit (e.g., address matches) and the hit load uop had completed without forwarding from the store uop (e.g., skipped the store uop), then this is a misprediction and a pipeline of the processing device should be flushed and the load uop re-executed as it use the wrong data. A store uop can assess whether a load uop skipped over the store uop upon performing the memory ordering check against loads in the load buffer.

In addition, when the store uop calculates its address, it also checks against the load buffer 130 for completed load uops that may have speculatively-forwarded data from the store uop based on the address prediction. In one implementation, the store buffer ID ("SB ID1") of the store uop with the calculated address is compared against the speculatively-forwarded store buffer ID ("SB ID2") stored in the load buffer 130 entries for each load uop that has used speculative forwarding based on store address prediction. If the SB ID1 is equal to the speculatively-forwarded SB ID2 (e.g., store uop is the one that speculatively forwarded for the load uop), the address prediction is checked for a match. If there is a match, then there is no misprediction. Otherwise (e.g., no address match), there is a misprediction and the load uop is marked for a processor pipeline flush and re-execution of the load uop. If the SB ID1 is different than speculatively-forwarded SB ID2, then an address match check is performed. If there is an address match (e.g., load uop forwarded from the wrong store uop), then a misprediction results and the load uop is marked for a processor pipeline flush and re-execution of the load uop.

In one implementation, load uops and store uops keep their ordering information. Uops in a processor pipeline maintain this information in a form of the reorder buffer id. The load buffer and store buffer (and reorder buffer) allocate in program order based on the reorder buffer id. When a load uop is allocated, it receives the store buffer id of the "youngest older" store uop (e.g., the store uop right before the load uop in the program order. This is sometimes called the store color. When a load uop is dispatched for memory ordering check against stores in the store buffer, the load uop may look up just those store uops with the same age or older than the store color. Similarly, when a store uop preforms memory ordering checking against load uops in the load buffer, the store uop looks at the store color of the load. If the load uop's store color is before the store's SB ID, it means that the load uop is excluded from the check.

The store address prediction of implementations of the disclosure may share certain commonalities with data prefetchers. However, there are several differences that set store address prediction apart from traditional data prefetchers. First, store address prediction enables loads to perform memory disambiguation against older, in-flight stores (in the store buffer) speculatively. Data prefetchers inject prefetch operations into the memory pipeline so that the expected cache lines would be brought in earlier than pure demand miss requests. As such, data prefetchers do not reduce load latency on store forwarding cases while store address prediction does. Second, store address prediction can operate on virtual address (e.g., "linear address" in some processor nomenclature). Data prefetchers typically inject physical address prefetch requests.

Third, store address prediction has a higher misprediction cost than data prefetchers. If a load speculatively forwards from a store and the predicted address turned out to be incorrect, for example, the load and its dependent operations need to be re-executed for functional correctness. This is typically realized by flushing the entire pipeline. Incorrect prefetch address results in data cache pollution but its impact is much smaller than pipeline flushes as cache pollution does not cause functional failure. In other words, a cache miss is not the same as pipeline flush. As such, store address prediction relies on significantly higher prediction accuracy than data prefetchers. Fourth, store address prediction predicts the given store's address, while data prefetchers predict a cache line address that may be useful in the future (e.g., typically from observed load addresses).

Figure 3A:
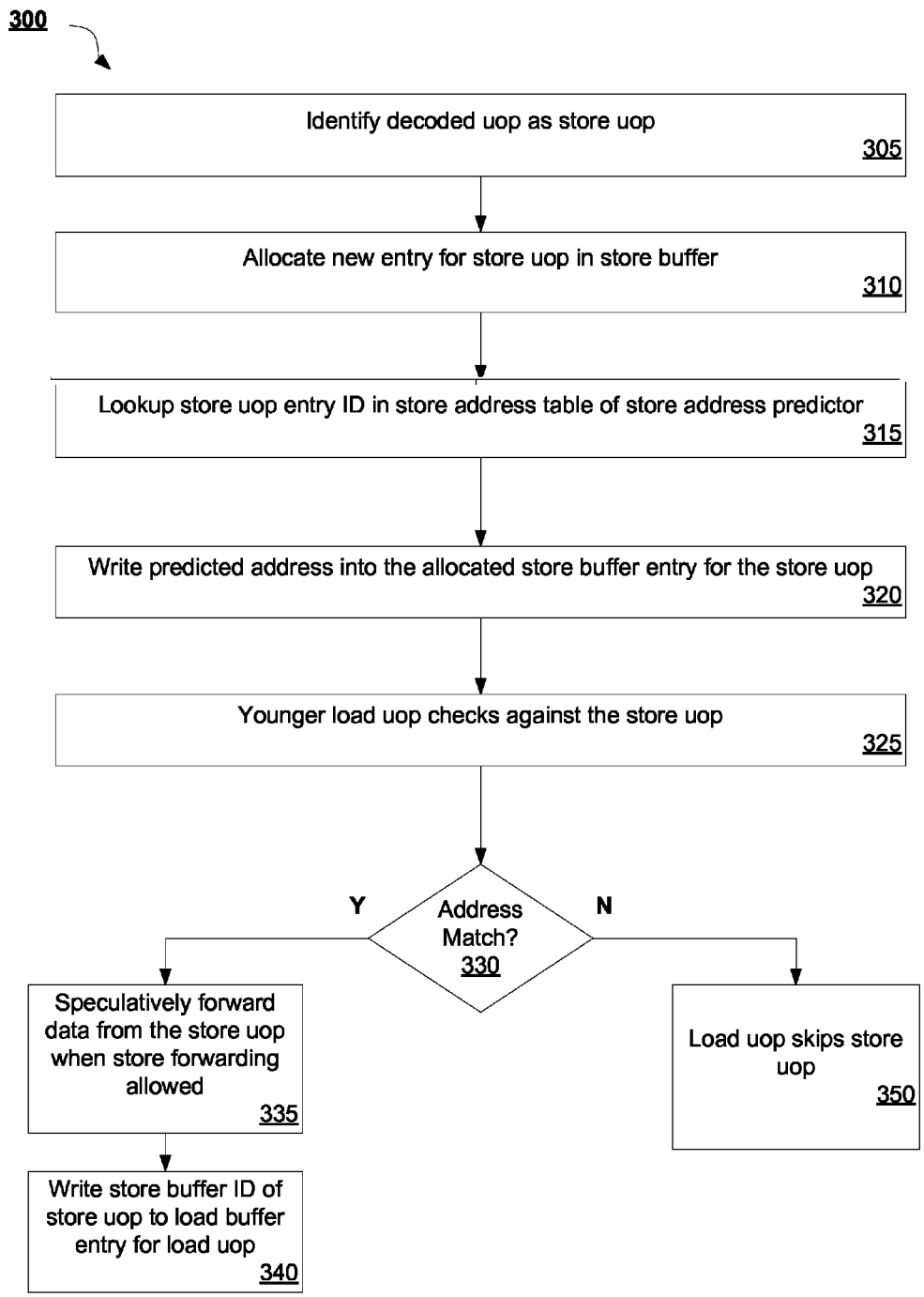
FIG. 3A is a flow diagram illustrating a method for store address prediction for memory disambiguation in a processing device according to an implementation of the disclosure.

FIG. 3A is a flow diagram illustrating a method 300 for store address prediction for memory disambiguation in a processing device according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by store address predictor 146 of FIGS. 1 and 2.

Method 300 begins at block 305 where a decoded uop is identified as a store uop. Then, at block 310 a new entry in a store buffer is allocated for the store uop. As part of allocating the new entry, at block 315, an entry for the store uop is looked up in a store address table of a store address predictor. In one implementation, the store address table is a CAM array that is indexed by each store uop's IP. At block 320, if the store address table includes an entry for the store uop and the entry has a predicted address that is allowed for prediction, then the predicted address is written into the allocated store buffer entry for the store uop. In one implementation, the store address table entry may include an entry state that allows or suppress prediction. If the entry state is set to allow prediction, then the store buffer may utilize the predicted store address in the store address table. Various prediction techniques may be used to predict as store address including, but not limited to, stride-based prediction.

At block 325, a target load instruction that is younger than the store instruction (in terms of logical program order) checks against the store instruction. Then, at decision block 330, the address of the younger load instruction is compared to the predicted address written to the store uop entry in the store buffer to determine a possible match.

If there is an address match at decision block 330, then method 300 continues to block 335 where data from the store uop is speculative forwarded to the load uop when such store forwarding is allowed. If the store uop data is not "forwardable" (e.g., store data is not ready yet or alignment of store and load addresses does not allow forwarding, etc.), then the load uop may behave as if the store uop does not have a speculative address, and thus there would be no address match at block 330.

Then, at block 340, a store buffer ID of the store uop is written into the load buffer entry for the load uop that used the speculatively forwarded data from the store uop. If, at decision block 330, the address of the load instruction does not match the predicted address of the store uop, then method 300 proceeds to block 350 where the load uop skips the store uop. In implementations of the disclosure, blocks 325 through 350 may be iterated through for all younger load instructions being dispatched during the time when the store buffer entry has a speculative address (and not a non-speculative, calculated address).

Figure 3B:
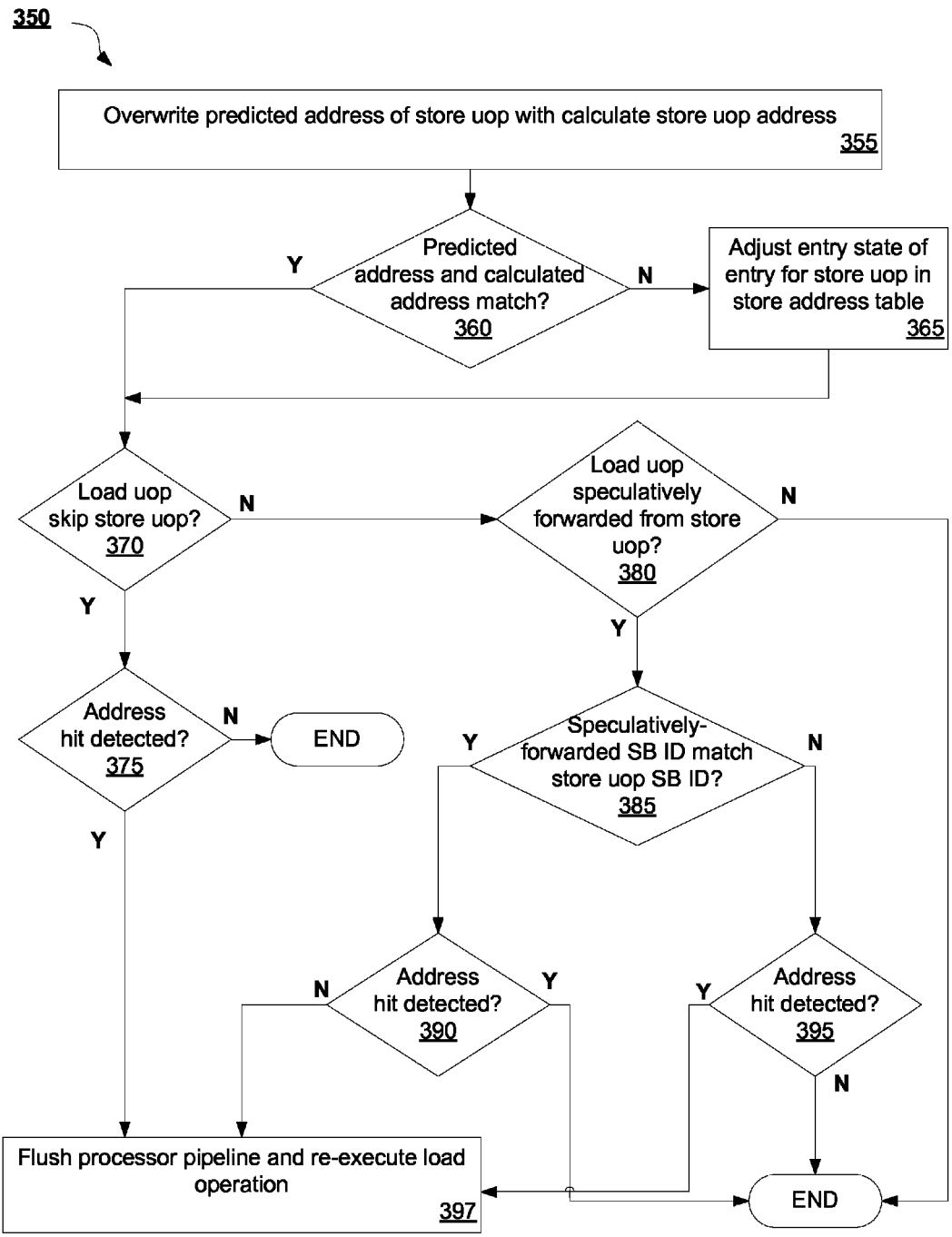
FIG. 3B is a flow diagram illustrating a method for store address prediction verification of memory disambiguation in a processing device according to an implementation of the disclosure.

FIG. 3B is a flow diagram illustrating a method 350 for store address prediction verification of memory disambiguation in a processing device according to an implementation of the disclosure. Method 350 may be performed by processing logic that may comprise hardware (e.g., circuitry, dedicated logic, programmable logic, microcode, etc.), software (such as instructions run on a processing device), firmware, or a combination thereof. In one embodiment, method 350 is performed by store address predictor 146 of FIGS. 1 and 2. Method 350 may be a continuation of method 300 described with respect to FIG. 3A.

Method 350 begins at block 355 where a predicted address of a store uop in a store buffer is overwritten with the calculated address of the store uop. As part of the overwriting process, method 350 verifies whether the predicted address was correct by proceeding to decision block 360. At decision block 360, it is determined whether the predicted address for the store uop and the calculated address match. If the addresses do match, then method 350 proceeds to decision block 370 discussed further below.

On the other hand, if the addresses do not match, method 350 continues to block 365 where an entry state for the store uop in the store address table of the store address predictor is adjusted. In one implementation, the entry state may be adjusted by incrementing a counter of the store uop entry in the store address table. The counter may be incremented each time a misprediction of the store uop address occurs. When the counter value exceeds a threshold, then the entry state of the store uop entry may be changed to suppress prediction of the store uop. Method 350 then proceeds to decision block 370.

Decision blocks 370 through 397 may be iterated through for each load uop in the load buffer that is younger than the store uop. At decision block 370, for a load uop in the load buffer, it is determined whether the load uop skipped the store uop. If the load uop did skip the store uop, then, at decision block 375, it is determined whether an address hit is detected between the calculated address and an address of the load uop. If so, then the processor pipeline is flushed the load uop is re-executed at block 397. If there is not an address hit, then method 300 ends and another load uop of the load buffer may be assessed at decision blocks 370 through 397.

If the load uop did not skip the store uop at decision block 370, then method 350 proceeds to decision block 380. At decision block 380, it is determined whether the entry for the load uop in the load buffer includes a speculatively-forwarded store buffer (SB) ID. As discussed above, a load uop may include an SB ID in its load buffer entry when the load uop speculatively forwards data from a store uop. If the load uop does not include an speculatively-forwarded SB ID in the load uop entry of the load buffer, then method 350 may end. On the other hand, if the load uop includes a speculatively-forwarded SB ID (e.g., the load uop speculatively forwarded data from a store uop in the store buffer), then method 350 continues to decision block 385.

At decision block 385, it is determined whether the load uop speculatively forwarded from the store uop. In one implementation, to determine whether the load uop speculative forwarded from the store uop, the speculatively-forwarded SB ID of the load uop entry is compared against the SB ID of the store uop. If they match, then the load uop did speculatively-forward data from the store uop and method 350 proceeds to decision block 390. At decision block 390, it is determined whether the load uop address matches the store uop calculated address (i.e., address hit). If not, then the load uop speculatively forwarded data from an incorrect address (e.g., misprediction), and the processor pipeline is flushed and the load uop rolled back at block 397. If an address hit is detected at decision block 390, then the load uop speculatively-forwarded data is correct and method 350 ends.

Referring back to decision block 385, if it is determined that the load uop did not speculatively forward data from the store uop, but rather speculatively forwarded data from a different store uop (as the SB IDs did not match), then method 350 proceeds to decision block 395. At decision block 395, it is determined whether the load uop address matches the store uop calculated address (i.e., address hit). If so (e.g., address hit), then the load uop speculatively forwarded data from an incorrect address (e.g., misprediction), and the processor pipeline is flushed and the load uop rolled back at block 397. If an address hit is not detected at decision block 395, then a misprediction is not detected in terms of the predicted address of the store uop and method 350 ends.

Figure 4A:
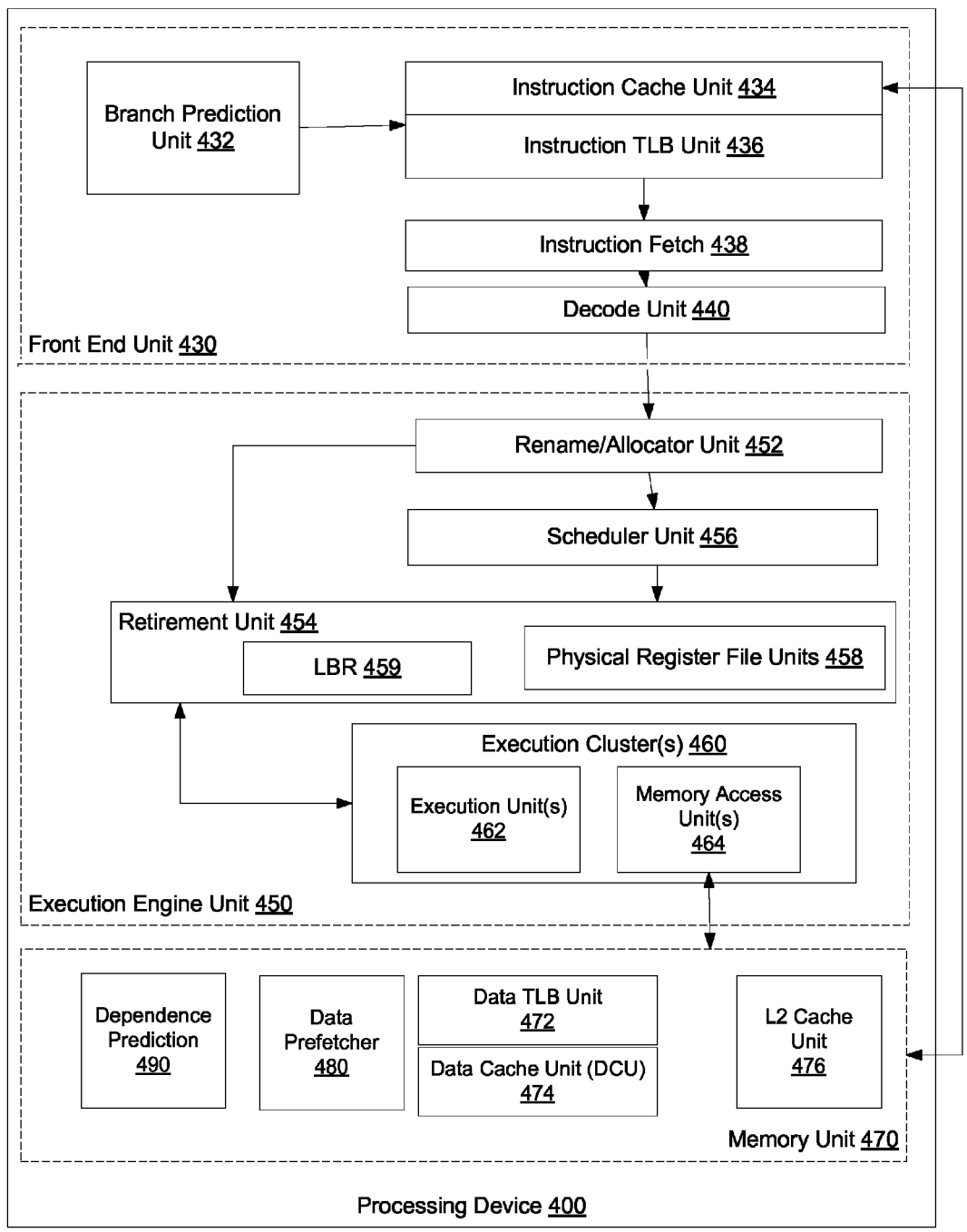
FIG. 4A is a block diagram illustrating a micro-architecture for a processor that implements elapsed cycle time in LBRs in which one embodiment of the disclosure may be used.

FIG. 4A is a block diagram illustrating a micro-architecture for a processor 400 that implements tracking elapsed cycle time in LBRs in accordance with one embodiment of the disclosure. Specifically, processor 400 depicts an in-order architecture core and a register renaming logic, out-of-order issue/execution logic to be included in a processor according to at least one embodiment of the disclosure.

Processor 400 includes a front end unit 430 coupled to an execution engine unit 450, and both are coupled to a memory unit 470. The processor 400 may include a reduced instruction set computing (RISC) core, a complex instruction set computing (CISC) core, a very long instruction word (VLIW) core, or a hybrid or alternative core type. As yet another option, processor 400 may include a special-purpose core, such as, for example, a network or communication core, compression engine, graphics core, or the like. In one embodiment, processor 400 may be a multi-core processor or may part of a multi-processor system.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 440 may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations (RS), central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which may include a dependence prediction unit 490, a data prefetcher 480, a data TLB unit 472, a data cache unit (DCU) 474, and a level 2 (L2) cache unit 476, to name a few examples. In one implementation, the dependence prediction unit 490 is the same as dependence prediction component 140 described with respect to FIG. 1, and includes a store address prediction component 146 to implement store address prediction for memory disambiguation described with respect to implementations of the disclosure. In some embodiments DCU 474 is also known as a first level data cache (L1 cache). The DCU 474 may handle multiple outstanding cache misses and continue to service incoming stores and loads. It also supports maintaining cache coherency. The data TLB unit 472 is a cache used to improve virtual address translation speed by mapping virtual and physical address spaces. In one exemplary embodiment, the memory access units 464 may include a load unit, a store address unit, and a store data unit, each of which is coupled to the data TLB unit 472 in the memory unit 470. The L2 cache unit 476 may be coupled to one or more other levels of cache and eventually to a main memory.

In one embodiment, the data prefetcher 480 speculatively loads/prefetches data to the DCU 474 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 400 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4B:
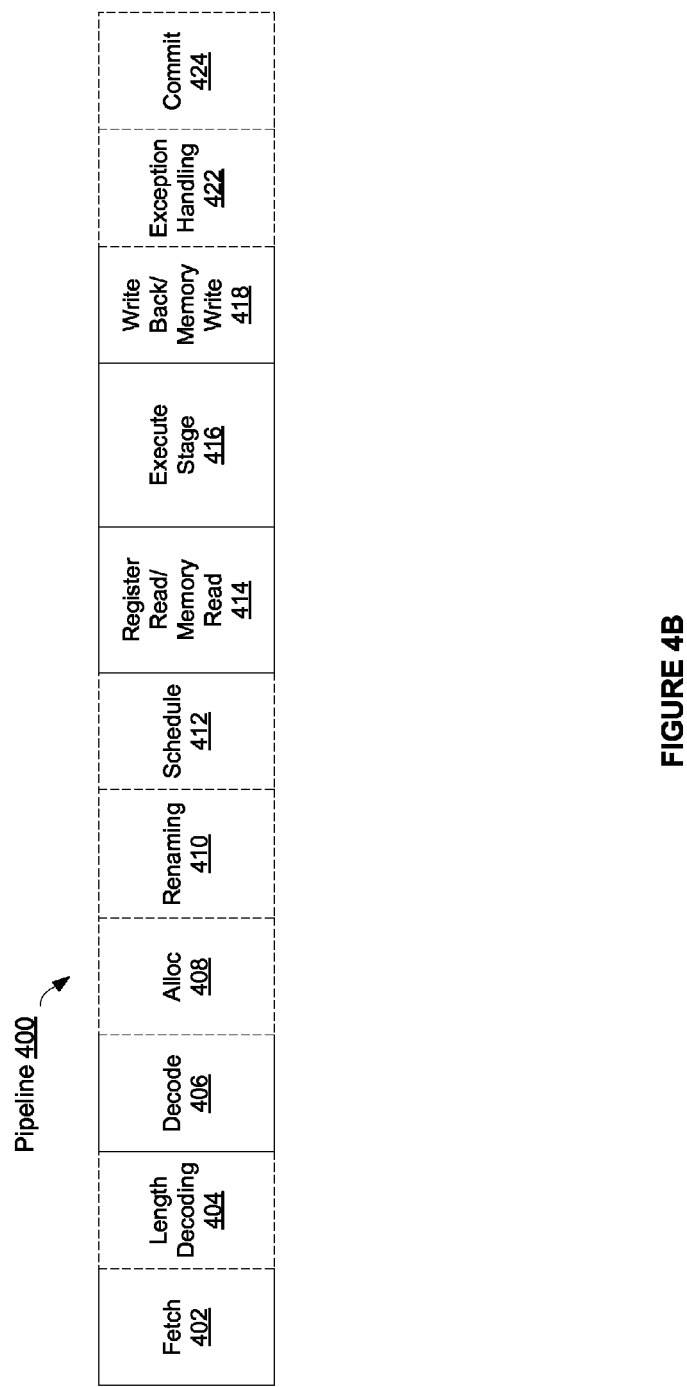
FIG. 4B is a block diagram illustrating an in-order pipeline and a register renaming stage, out-of-order issue/execution pipeline implemented according to at least one embodiment of the disclosure.

FIG. 4B is a block diagram illustrating an in-order pipeline and a register renaming stage, out-of-order issue/execution pipeline implemented by processing device 400 of FIG. 4A according to some embodiments of the disclosure. The solid lined boxes in FIG. 4B illustrate an in-order pipeline, while the dashed lined boxes illustrates a register renaming, out-of-order issue/execution pipeline. In FIG. 4B, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424. In some embodiments, the ordering of stages 402-424 may be different than illustrated and are not limited to the specific ordering shown in FIG. 4B.

Figure 5:
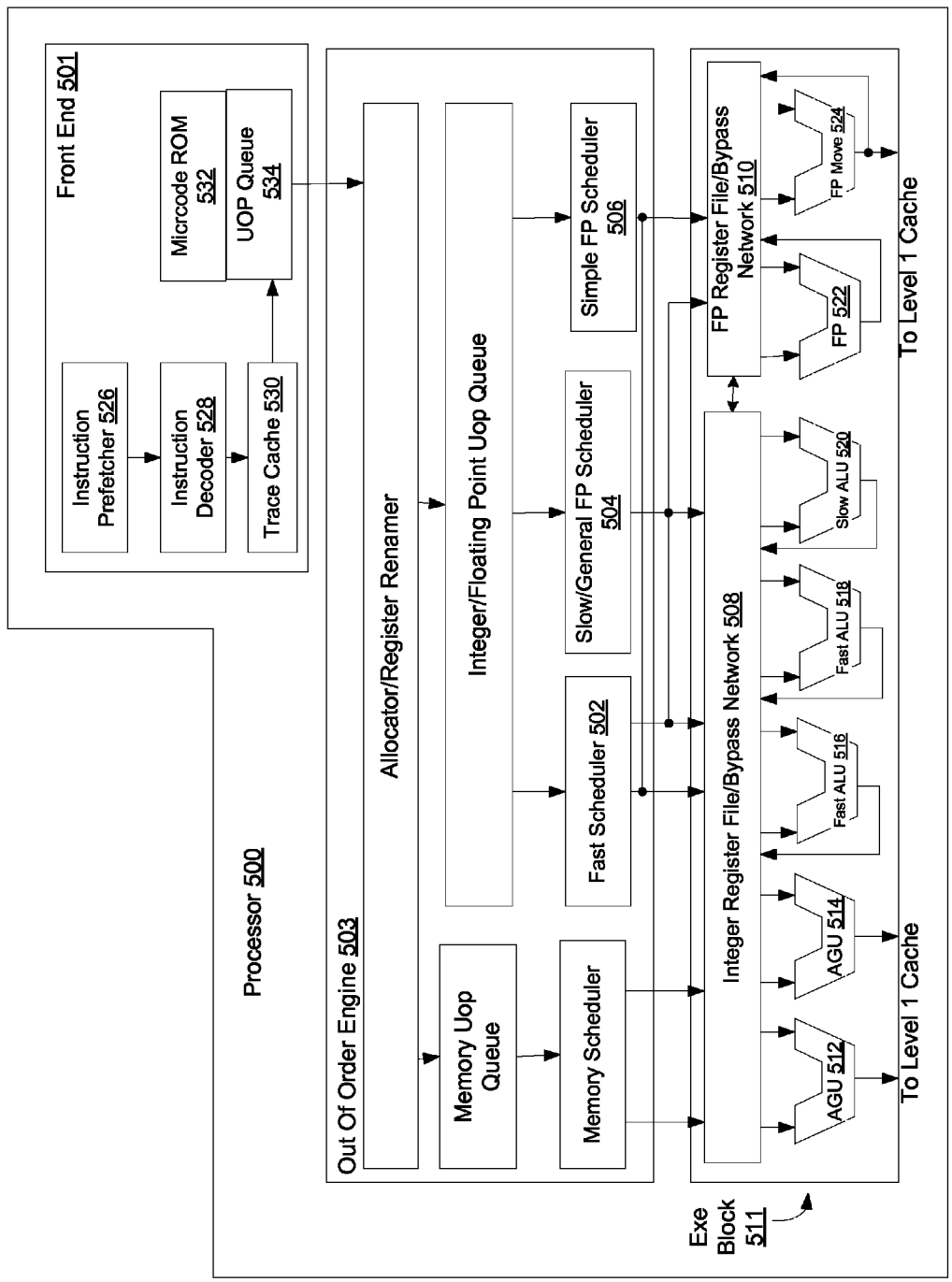
FIG. 5 illustrates a block diagram of the micro-architecture for a processor that includes logic circuits to perform tracking elapsed cycle time in LBRs in accordance with one embodiment of the disclosure.

FIG. 5 illustrates a block diagram of the micro-architecture for a processor 500 that includes logic circuits to track elapsed cycle time in LBRs in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 501 is the part of the processor 500 that fetches instructions to be executed and prepares them to be used later in the processor pipeline.

The front end 501 may include several units. In one embodiment, the instruction prefetcher 526 fetches instructions from memory and feeds them to an instruction decoder 528 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others need several micro-ops to complete the full operation. In one embodiment, if more than four micro-ops are needed to complete an instruction, the decoder 528 accesses the microcode ROM 532 to do the instruction. For one embodiment, an instruction can be decoded into a small number of micro ops for processing at the instruction decoder 528. In another embodiment, an instruction can be stored within the microcode ROM 532 should a number of micro-ops be needed to accomplish the operation. The trace cache 530 refers to an entry point programmable logic array (PLA) to determine a correct micro-instruction pointer for reading the micro-code sequences to complete one or more instructions in accordance with one embodiment from the microcode ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506, determine when a uop is ready to execute based on the readiness of their dependent input register operand sources and the availability of the execution resources the uops need to complete their operation. The fast scheduler 502 of one embodiment can schedule on each half of the main clock cycle while the other schedulers can only schedule once per main processor clock cycle. The schedulers arbitrate for the dispatch ports to schedule uops for execution.

Register files 508, 510, sit between the schedulers 502, 504, 506, and the execution units 512, 514, 516, 518, 520, 522, 524 in the execution block 511. There is a separate register file 508, 510, for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 64 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions need to execute. The processor 500 of one embodiment is comprised of a number of execution units: address generation unit (AGU) 512, AGU 514, fast ALU 516, fast ALU 518, slow ALU 520, floating point ALU 522, floating point move unit 524. For one embodiment, the floating point execution blocks 522, 524, execute floating point, MMX, SIMD, and SSE, or other operations. The floating point ALU 522 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one embodiment, the integer ALUs 516, 518, 520, are described in the context of performing integer operations on 64 bit data operands. In alternative embodiments, the ALUs 516, 518, 520, can be implemented to support a variety of data bits including 16, 32, 128, 256, etc. Similarly, the floating point units 522, 524, can be implemented to support a range of operands having bits of various widths. For one embodiment, the floating point units 522, 524, can operate on 128 bits wide packed data operands in conjunction with SIMD and multimedia instructions.

In one embodiment, the uops schedulers 502, 504, 506, dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 500 also includes logic to implement store address prediction for memory disambiguation according to embodiments of the disclosure. In one embodiment, the execution block 511 of processor 500 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 6:
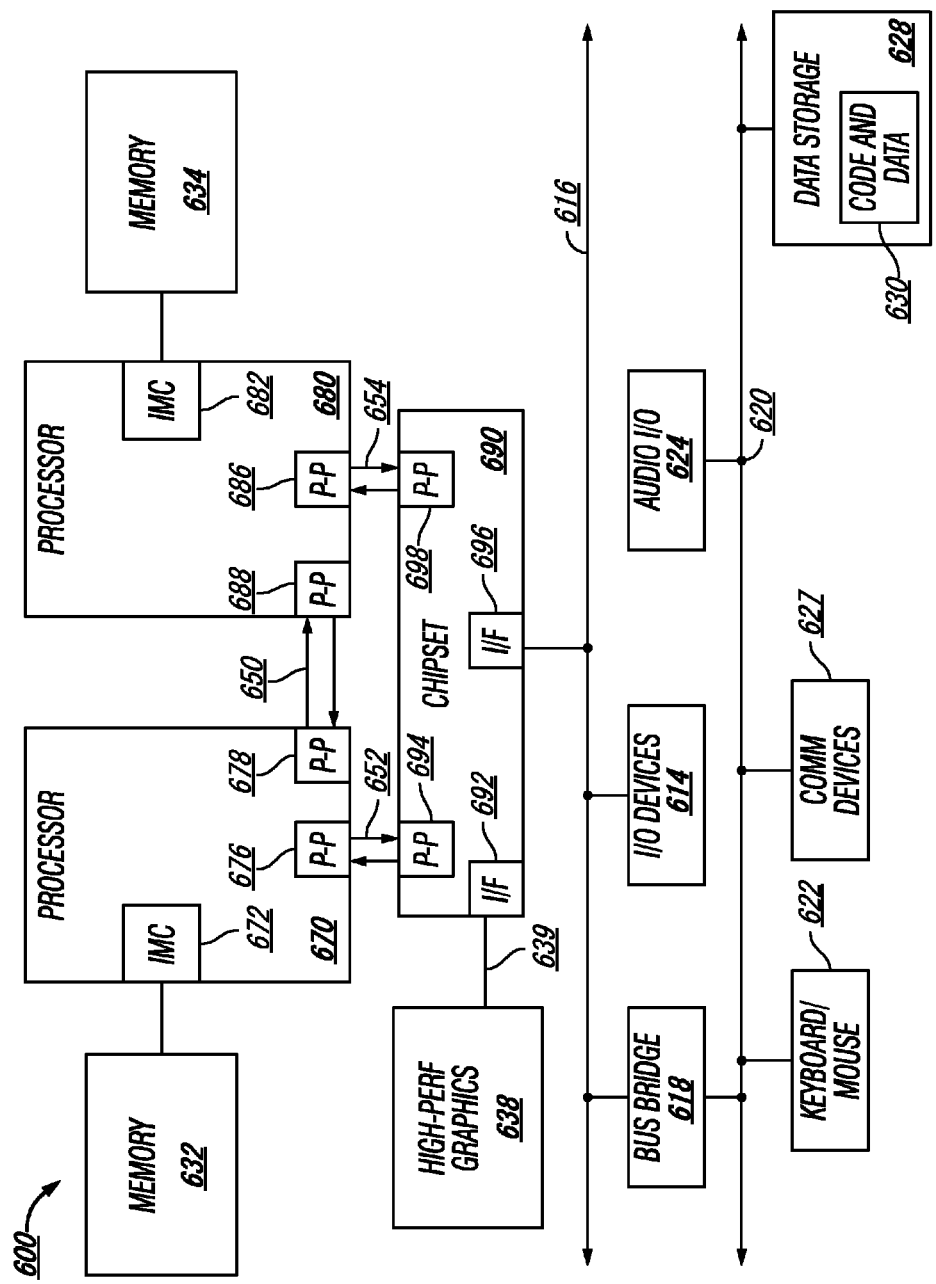
FIG. 6 is a block diagram illustrating a system in which an embodiment of the disclosure may be used.

Referring now to FIG. 6, shown is a block diagram illustrating a system 600 in which an embodiment of the disclosure may be used. As shown in FIG. 6, multiprocessor system 600 is a point-to-point interconnect system, and includes a first processor 670 and a second processor 680 coupled via a point-to-point interconnect 650. While shown with only two processors 670, 680, it is to be understood that the scope of embodiments of the disclosure is not so limited. In other embodiments, one or more additional processors may be present in a given processor. In one embodiment, the multiprocessor system 600 may implement store address prediction for memory disambiguation as described herein.

Processors 670 and 680 are shown including integrated memory controller units 672 and 682, respectively. Processor 670 also includes as part of its bus controller units point-to-point (P-P) interfaces 676 and 678; similarly, second processor 680 includes P-P interfaces 686 and 688. Processors 670, 680 may exchange information via a point-to-point (P-P) interface 650 using P-P interface circuits 678, 688. As shown in FIG. 6, IMCs 672 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, 698. Chipset 690 may also exchange information with a high-performance graphics circuit 638 via a high-performance graphics interface 639.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present disclosure is not so limited.

As shown in FIG. 6, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard and/or mouse 622, communication devices 627 and a storage unit 628 such as a disk drive or other mass storage device which may include instructions/code and data 630, in one embodiment. Further, an audio I/O 624 may be coupled to second bus 620. Note that other architectures are possible. For example, instead of the point-to-point architecture of FIG. 6, a system may implement a multi-drop bus or other such architecture.

Figure 7:
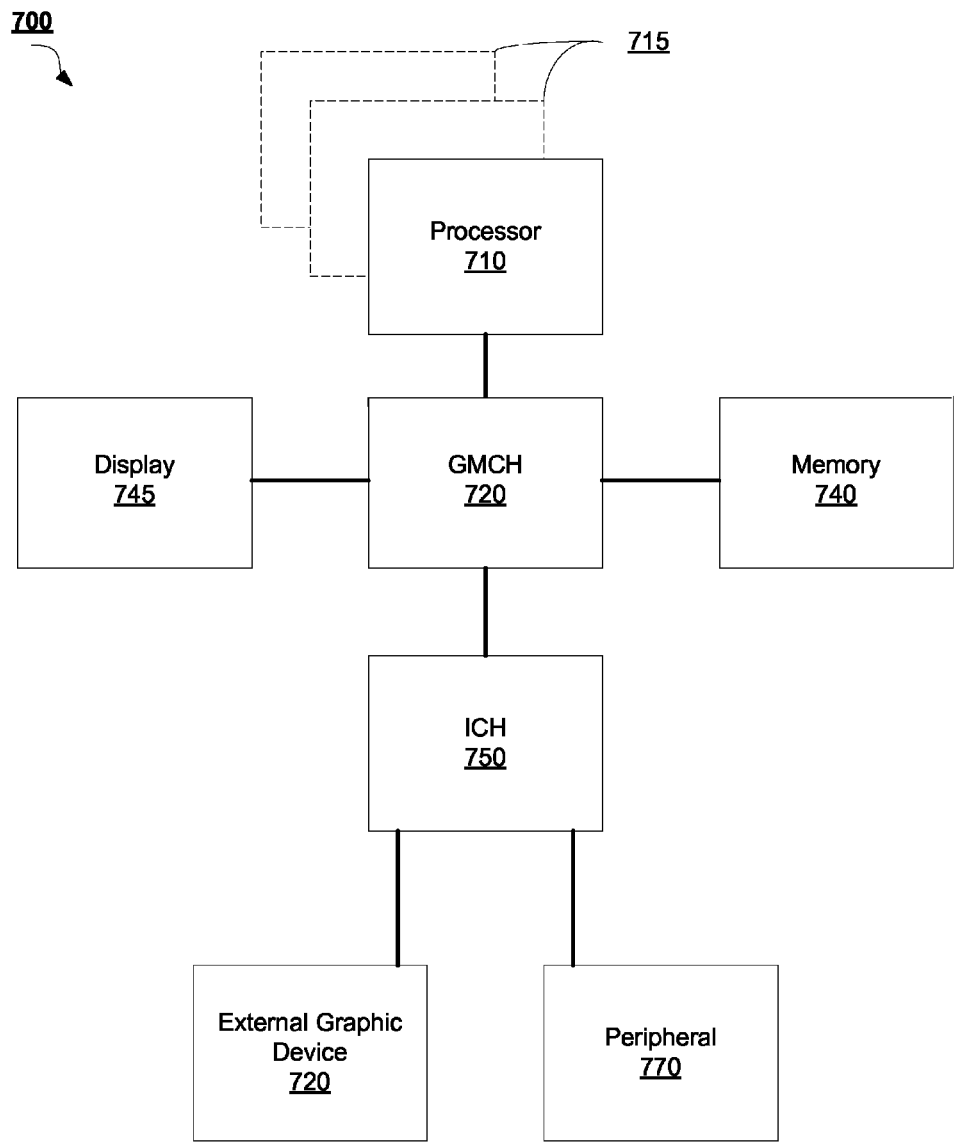
FIG. 7 is a block diagram of a system in which an embodiment of the disclosure may operate.

Referring now to FIG. 7, shown is a block diagram of a system 700 in which one embodiment of the disclosure may operate. The system 700 may include one or more processors 710, 715, which are coupled to graphics memory controller hub (GMCH) 720. The optional nature of additional processors 715 is denoted in FIG. 7 with broken lines. In one embodiment, processors 710, 715 implement store address prediction for memory disambiguation according to embodiments of the disclosure.

Each processor 710, 715 may be some version of the circuit, integrated circuit, processor, and/or silicon integrated circuit as described above. However, it should be noted that it is unlikely that integrated graphics logic and integrated memory control units would exist in the processors 710, 715. FIG. 7 illustrates that the GMCH 720 may be coupled to a memory 740 that may be, for example, a dynamic random access memory (DRAM). The DRAM may, for at least one embodiment, be associated with a non-volatile cache.

The GMCH 720 may be a chipset, or a portion of a chipset. The GMCH 720 may communicate with the processor(s) 710, 715 and control interaction between the processor(s) 710, 715 and memory 740. The GMCH 720 may also act as an accelerated bus interface between the processor(s) 710, 715 and other elements of the system 700. For at least one embodiment, the GMCH 720 communicates with the processor(s) 710, 715 via a multi-drop bus, such as a frontside bus (FSB) 795.

Furthermore, GMCH 720 is coupled to a display 745 (such as a flat panel or touchscreen display). GMCH 720 may include an integrated graphics accelerator. GMCH 720 is further coupled to an input/output (I/O) controller hub (ICH) 750, which may be used to couple various peripheral devices to system 700. Shown for example in the embodiment of FIG. 7 is an external graphics device 760, which may be a discrete graphics device, coupled to ICH 750, along with another peripheral device 770.

Alternatively, additional or different processors may also be present in the system 700. For example, additional processor(s) 715 may include additional processors(s) that are the same as processor 710, additional processor(s) that are heterogeneous or asymmetric to processor 710, accelerators (such as, e.g., graphics accelerators or digital signal processing (DSP) units), field programmable gate arrays, or any other processor. There can be a variety of differences between the processor(s) 710, 715 in terms of a spectrum of metrics of merit including architectural, micro-architectural, thermal, power consumption characteristics, and the like. These differences may effectively manifest themselves as asymmetry and heterogeneity amongst the processors 710, 715. For at least one embodiment, the various processors 710, 715 may reside in the same die package.

Figure 8:
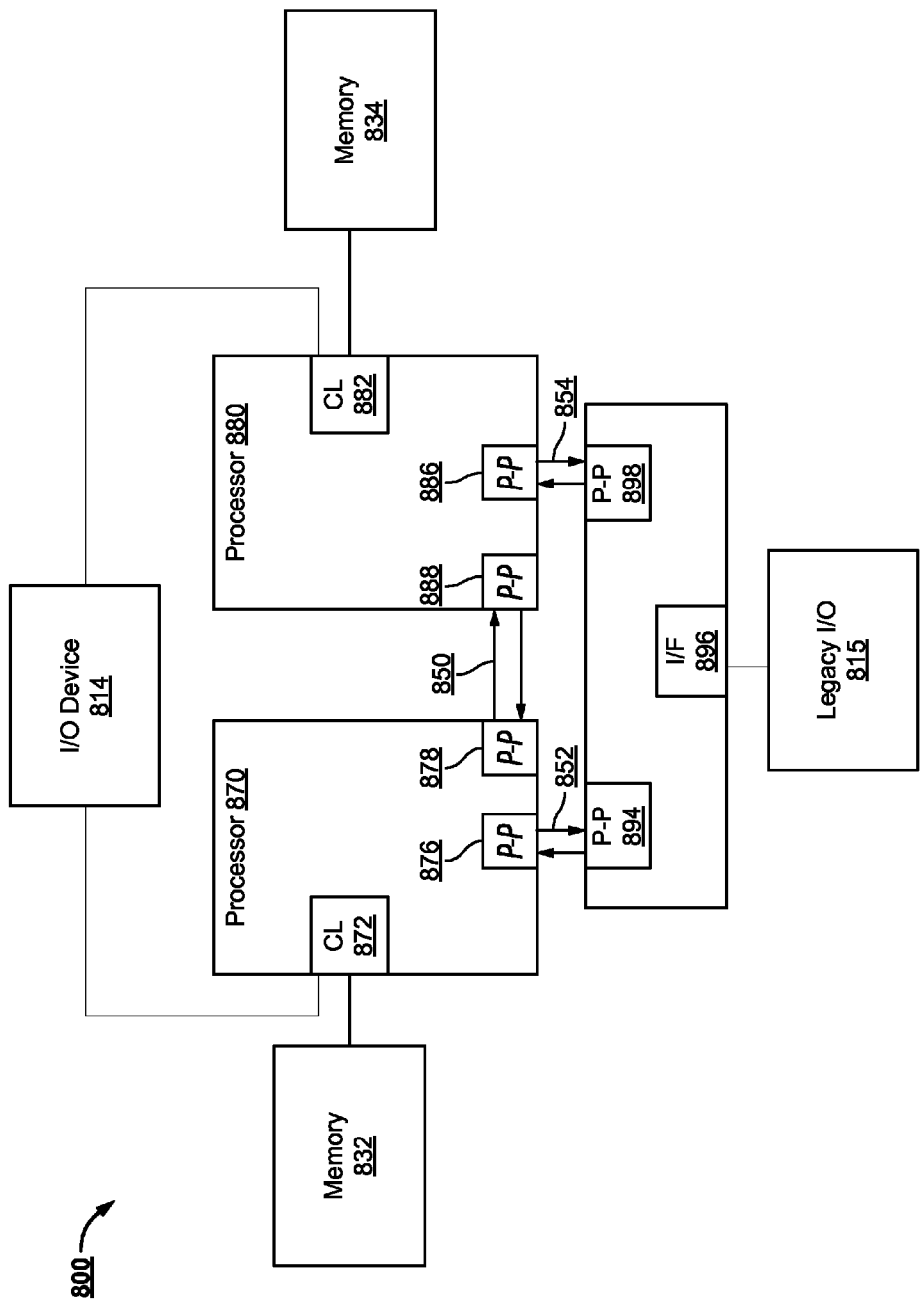
FIG. 8 is a block diagram of a system in which an embodiment of the disclosure may operate.

Referring now to FIG. 8, shown is a block diagram of a system 800 in which an embodiment of the disclosure may operate. FIG. 8 illustrates processors 870, 880. In one embodiment, processors 870, 880 may implement store address prediction for memory disambiguation as described above. Processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one embodiment, the CL 872, 882 may include integrated memory controller units. CLs 872, 882 may include I/O control logic. As depicted, memories 832, 834 coupled to CLs 872, 882 and I/O devices 814 are also coupled to the control logic 872, 882. Legacy I/O devices 815 are coupled to the chipset 890 via interface 896.

Figure 9:
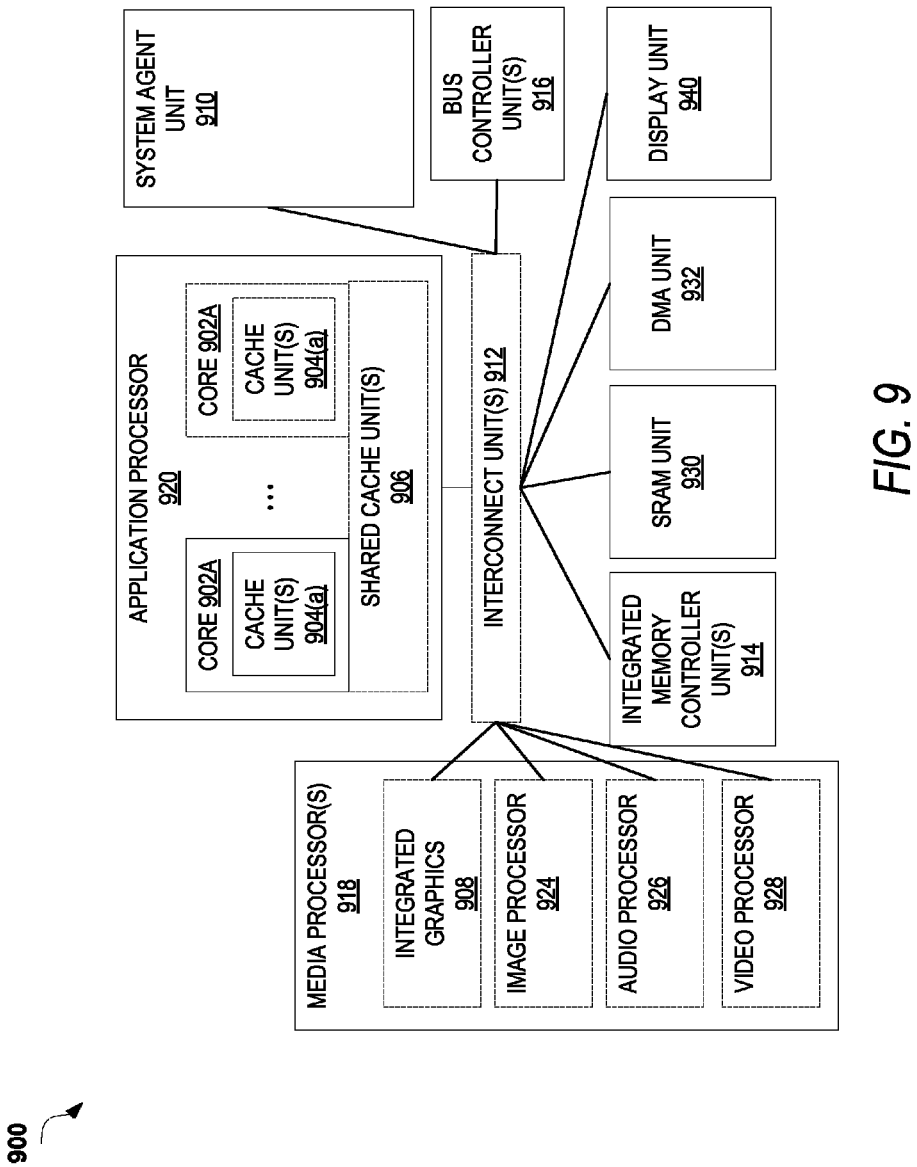
FIG. 9 is a block diagram of a System-on-a-Chip (SoC) in accordance with an embodiment of the present disclosure

Embodiments may be implemented in many different system types. FIG. 9 is a block diagram of a SoC 900 in accordance with an embodiment of the present disclosure. Dashed lined boxes are optional features on more advanced SoCs. In FIG. 9, an interconnect unit(s) 912 is coupled to: an application processor 920 which includes a set of one or more cores 902A-N and shared cache unit(s) 906; a system agent unit 910; a bus controller unit(s) 916; an integrated memory controller unit(s) 914; a set or one or more media processors 918 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays. In one embodiment, a memory module may be included in the integrated memory controller unit(s) 914. In another embodiment, the memory module may be included in one or more other components of the SoC 900 that may be used to access and/or control a memory. The application processor 920 may include a store address predictor for implementing store address prediction for memory disambiguation as described in embodiments herein.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture and/or instruction set. For example, some of the cores 902A-N may be in order while others are out-of-order. As another example, two or more of the cores 902A-N may be capable of execution the same instruction set, while others may be capable of executing only a subset of that instruction set or a different instruction set.

The application processor 920 may be a general-purpose processor, such as a Core™ i3, i5, i7, 2 Duo and Quad, Xeon™, Itanium™, XScale™ or StrongARM™ processor, which are available from Intel™ Corporation, of Santa Clara, Calif. Alternatively, the application processor 920 may be from another company, such as ARM Holdings™, Ltd, MIPS™, etc. The application processor 920 may be a special-purpose processor, such as, for example, a network or communication processor, compression engine, graphics processor, co-processor, embedded processor, or the like. The application processor 920 may be implemented on one or more chips. The application processor 920 may be a part of and/or may be implemented on one or more substrates using any of a number of process technologies, such as, for example, BiCMOS, CMOS, or NMOS.

Figure 10:
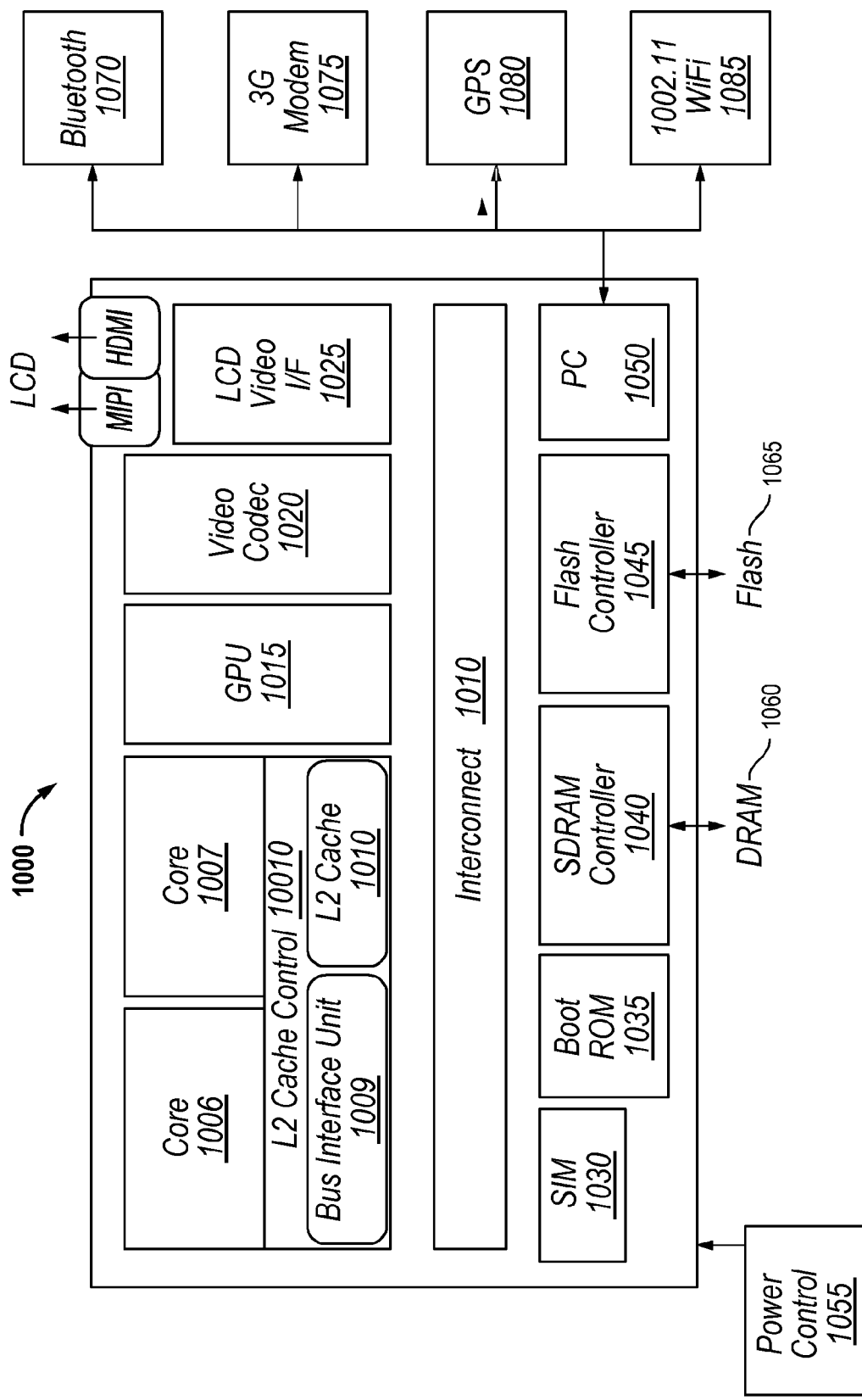
FIG. 10 is a block diagram of an embodiment of an SoC design in accordance with the present disclosure.

FIG. 10 is a block diagram of an embodiment of a system on-chip (SoC) design in accordance with the present disclosure. As a specific illustrative example, SoC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1000 includes 2 cores—1006 and 1007. Cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1010 includes an on-chip interconnect, such as an IOSF, AMBA, or other interconnect discussed above, which potentially implements one or more aspects of the described disclosure. In one embodiment, a store address predictor for implementing store address prediction for memory disambiguation may be included in cores 1006, 1007.

Interconnect 1010 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the disclosure described herein. In addition, the system 1000 illustrates peripherals for communication, such as a Bluetooth module 1070, 3G modem 1075, GPS 1080, and Wi-Fi 1085.

Figure 11:
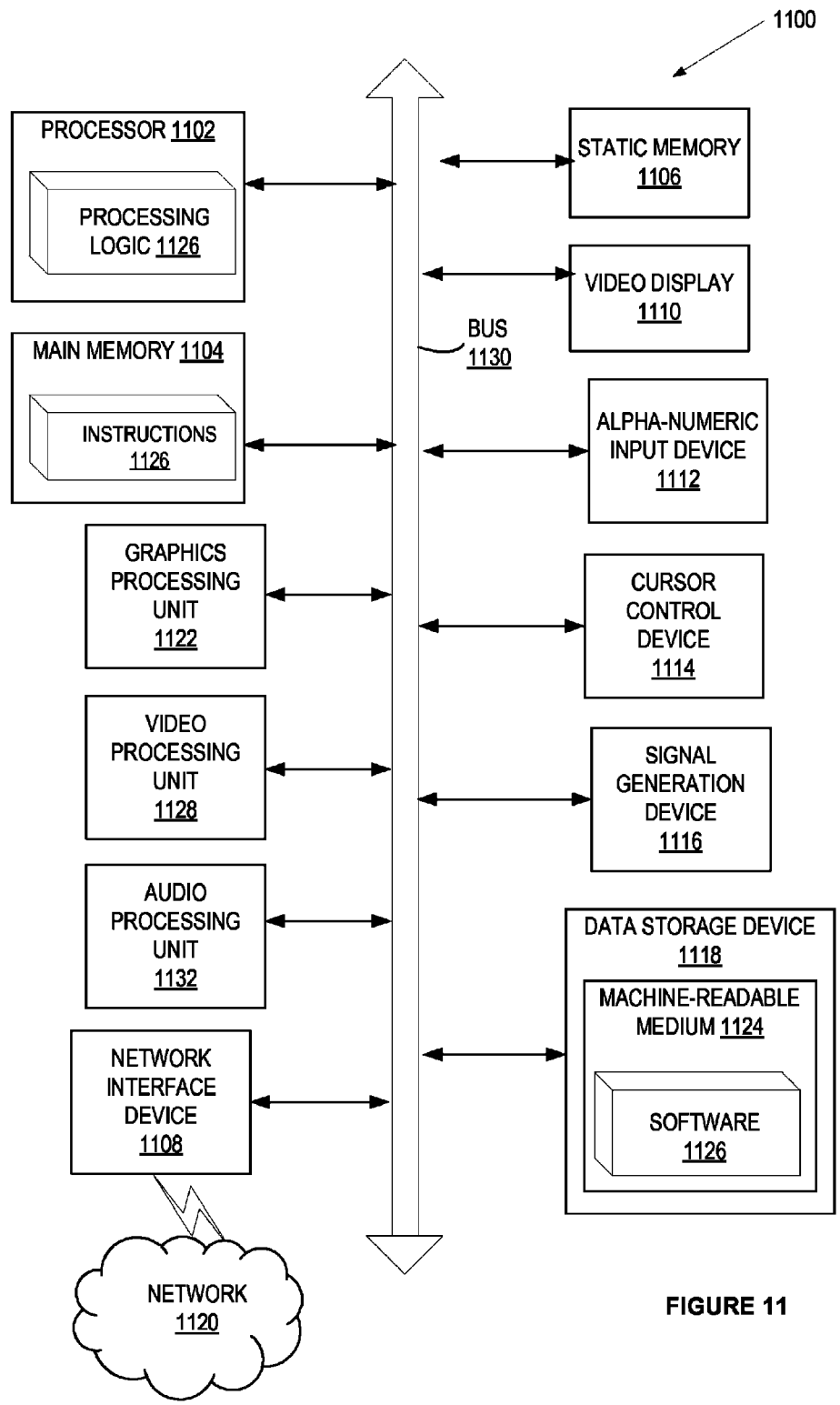
FIG. 11 illustrates a block diagram of one embodiment of a computer system.

FIG. 11 illustrates a diagrammatic representation of a machine in the example form of a computer system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1100 includes a processing device 1102, a main memory 1104 (e.g., read-only memory (ROM), flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In one embodiment, processing device 1102 may include one or processing cores. The processing device 1102 is configured to execute the processing logic 1126 for performing the operations and steps discussed herein. In one embodiment, processing device 1102 is the same as processor architecture 100 described with respect to FIG. 1 that implements store address prediction for memory disambiguation as described herein with embodiments of the disclosure.

The computer system 1100 may further include a network interface device 1108 communicably coupled to a network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker). Furthermore, computer system 1100 may include a graphics processing unit 1122, a video processing unit 1128, and an audio processing unit 1132.

The data storage device 1118 may include a machine-accessible storage medium 1124 on which is stored software 1126 implementing any one or more of the methodologies of functions described herein, such as implementing store address prediction for memory disambiguation as described above. The software 1126 may also reside, completely or at least partially, within the main memory 1104 as instructions 1126 and/or within the processing device 1102 as processing logic 1126 during execution thereof by the computer system 1100; the main memory 1104 and the processing device 1102 also constituting machine-accessible storage media.

The machine-readable storage medium 1124 may also be used to store instructions 1126 implementing store address prediction for memory disambiguation such as described with respect to store address prediction component 146 in FIGS. 1 and 2, and/or a software library containing methods that call the above applications. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processing device for implementing store address prediction for memory disambiguation in a processing device. Further to Example 1, the processing device comprises a store address predictor to predict an address for store operations that store data to a memory hierarchy and a store buffer communicably coupled to the store address predictor, the store buffer to buffer the store operations prior to completion, the store buffer to comprise the predicted address for each of the store operations. The processing device of Example 1 further includes a load buffer communicably coupled to the store address predictor, the load buffer to buffer a load operation, the load operation to reference the store buffer to, based on the predicted addresses, determine whether to speculatively execute ahead of a respective store operation and to determine whether to speculatively forward data from the respective store operation.

In Example 2, the subject matter of Example 1 can optionally include wherein the store address predictor comprises a store address table comprising entries for the store operations, each entry comprising an index associated with an instruction point (IP) of an associated store operation of the store operations, the predicted address for the associated store operation, an entry state for the entry, and a counter value for the entry. In Example 3, the subject matter of any one of Examples 1-2 can optionally include wherein the store address table is a content addressable memory (CAM) array and the index is the IP of the associated store operation. In Example 4, the subject matter of any one of Examples 1-3 can optionally include wherein the store address predictor further comprises an address prediction component to generate the predicted addresses.

In Example 5, the subject matter of any one of Examples 1-4 can optionally include wherein the address prediction component to generate the predicted addresses based on stride calculations of the store operations. In Example 6, the subject matter of any one of Examples 1-5 can optionally include wherein the store address predictor further comprises a threshold comparison component to determine, for each of the entries, whether the counter value exceeds a counter threshold has been reached by the counter value of the entry. In Example 7, the subject matter of any one of Examples 1-6 can optionally include wherein when the counter threshold has been reached, the address prediction component to set the entry state of the entry to suppress use of the predicted address by the store buffer.

In Example 8, the subject matter of any one of Examples 1-7 can optionally include wherein the load buffer comprising an entry for the load operation that comprises a store buffer ID field to store a store buffer ID of an entry of the store buffer corresponding to a store operation from which the load operation speculatively forwarded data. In Example 9, the subject matter of any one of Examples 1-8 can optionally include wherein when a dispatched store operation of the store operations calculates a store address, the store buffer to overwrite the predicted address in the store buffer for the dispatched store operation with the calculated store address. In Example 10, the subject matter of any one of Examples 1-9 can optionally include wherein the store buffer to verify whether the predicted address and the calculated address match.

In Example 11, the subject matter of any one of Examples 1-10 can optionally include wherein when the predicted address and the calculated address do not match, the store address predictor to increment the counter value for the entry associated with the dispatched store operation. In Example 12, the subject matter of any one of Examples 1-11 can optionally include wherein the load operation is indicated as mispredicted when at least one of the load operation speculatively executes ahead of the dispatched store operation without speculatively forwarding data from the dispatched store operation and comprises an address that matches the calculated address, the load operation speculatively forwarded the data from the dispatched store operation and the address of the load operation does not match the calculated address, or the load operation speculatively forwarded data from another store operation of the store operations and the address of the load operation matches the calculated address. All optional features of the apparatus described above may also be implemented with respect to the method or process described herein.

Example 13 is a method for implementing store address prediction for memory disambiguation in a processing device comprising predicting, by a store address predictor of a processing device, an address for store operations that stores data to a memory hierarchy, allocating an entry in a store buffer for buffering the store operations prior to completion, the entry in the store buffer comprising the predicted address for each of the store operations, and referencing, by a load operation of the processing device, the predicted address in the store buffer to determine whether to speculatively execute ahead of each store operation and to determine whether to speculatively forward data from one of the store operations.

In Example 14, the subject matter of Example 13 can optionally include wherein the store address predictor comprises a store address table comprising entries for the store operations, each entry comprising an index associated with an instruction point (IP) of an associated store operation of the store operations, the predicted address for the associated store operation, an entry state for the entry, and a counter value for the entry. In Example 15, the subject matter of any one of Examples 13-14 can optionally include wherein the store address predictor further comprises an address prediction component to generate the predicted addresses.

In Example 16, the subject matter of any one of Examples 13-15 can optionally include further comprising generating, by the address prediction component, the predicted addresses based on stride calculations of the store operations. In Example 17, the subject matter of any one of Examples 13-16 can optionally include wherein the store address predictor further comprises a threshold comparison component to determine, for each of the entries, whether the counter value exceeds a counter threshold has been reached by the counter value of the entry.

In Example 18, the subject matter of any one of Examples 13-17 can optionally include further comprising, when the counter threshold has been reached, setting, by the address prediction component, the entry state of the entry to suppress use of the predicted address by the store buffer. In Example 19, the subject matter of any one of Examples 13-18 can optionally include further comprising a load buffer for buffering the load operation, the load buffer comprising an entry for the load operation that comprises a store buffer ID field to store a store buffer ID of an entry of the store buffer corresponding to a store operation from which the load operation speculatively forwarded data. In Example 20, the subject matter of any one of Examples 13-19 can optionally include wherein when a dispatched store operation of the store operations calculates a store address, overwriting the predicted address in the store buffer for the dispatched store operation with the calculated store address.

In Example 21, the subject matter of any one of Examples 13-20 can optionally include further comprising verifying whether the predicted address and the calculated address match. In Example 22, the subject matter of any one of Examples 13-21 can optionally include wherein when the predicted address and the calculated address do not match, incrementing the counter value for the entry associated with the dispatched store operation. In Example 23, the subject matter of any one of Examples 13-22 can optionally include wherein the load operation is indicated as mispredicted when at least one of the load operation speculatively executes ahead of the dispatched store operation without speculatively forwarding data from the dispatched store operation and comprises an address that matches the calculated address, the load operation speculatively forwarded the data from the dispatched store operation and the address of the load operation does not match the calculated address, or the load operation speculatively forwarded data from another store operation of the store operations and the address of the load operation matches the calculated address Example 24 is a system for implementing store address prediction for memory disambiguation in a processing device. In Example 24, the system includes a memory hierarchy, and a processing device communicably coupled to the memory hierarchy, the processing device comprising an execution unit. Further to Example 24, the execution unit comprises a store address predictor to predict an address for store operations that store data to the memory hierarchy, a store buffer for buffering the store operations prior to completion, the store buffer to comprise the predicted address for each of the store operations, and a load buffer communicably coupled to the store address predictor, the load buffer to buffer a load operation, the load operation to reference the store buffer to, based on the predicted addresses, determine whether to speculatively execute ahead of each store operation and to determine whether to speculatively forward data from one of the store operations.

In Example 25, the subject matter of Example 24 can optionally include wherein the store address predictor comprises a store address table comprising entries for the store operations, each entry comprising an index associated with an instruction point (IP) of an associated store operation of the store operations, the predicted address for the associated store operation, an entry state for the entry, and a counter value for the entry. In Example 26, the subject matter of any one of Examples 24-25 can optionally include wherein the store address table is a content addressable memory (CAM) array and the index is the IP of the associated store operation. In Example 27, the subject matter of any one of Examples 24-26 can optionally include wherein the store address predictor further comprises an address prediction component to generate the predicted addresses.

In Example 28, the subject matter of any one of Examples 24-27 can optionally include wherein the address prediction component to generate the predicted addresses based on stride calculations of the store operations. In Example 29, the subject matter of any one of Examples 4-28 can optionally include wherein the store address predictor further comprises a threshold comparison component to determine, for each of the entries, whether the counter value exceeds a counter threshold has been reached by the counter value of the entry.

In Example 30, the subject matter of any one of Examples 24-29 can optionally include wherein when the counter threshold has been reached, the address prediction component to set the entry state of the entry to suppress use of the predicted address by the store buffer. In Example 31, the subject matter of any one of Examples 24-30 can optionally include wherein the load buffer comprising an entry for the load operation that comprises a store buffer ID field to store a store buffer ID of an entry of the store buffer corresponding to a store operation from which the load operation speculatively forwarded data. In Example 32, the subject matter of any one of Examples 24-31 can optionally include wherein when a dispatched store operation of the store operations calculates a store address, the store buffer to overwrite the predicted address in the store buffer for the dispatched store operation with the calculated store address.

In Example 33, the subject matter of any one of Examples 24-32 can optionally include wherein the store buffer to verify whether the predicted address and the calculated address match, and wherein when the predicted address and the calculated address do not match, the store address predictor to increment the counter value for the entry associated with the dispatched store operation. In Example 34, the subject matter of any one of Examples 24-33 can optionally include wherein the load operation is indicated as mispredicted when at least one of the load operation speculatively executes ahead of the dispatched store operation without speculatively forwarding data from the dispatched store operation and comprises an address that matches the calculated address, the load operation speculatively forwarded the data from the dispatched store operation and the address of the load operation does not match the calculated address, or the load operation speculatively forwarded data from another store operation of the store operations and the address of the load operation matches the calculated address. All optional features of the system described above may also be implemented with respect to the method or process described herein.

Example 35 is a non-transitory computer-readable medium for implementing store address prediction for memory disambiguation in a processing device. In Example 35, the non-transitory machine-readable medium includes data that, when accessed by a processing device, cause the processing device to perform operations comprising predicting, by a store address predictor of the processing device, an address for store operations that stores data to a memory hierarchy, allocating an entry in a store buffer for buffering the store operations prior to completion, the entry in the store buffer comprising the predicted address for each of the store operations, and referencing, by a load operation of the processing device, the predicted address in the store buffer to determine whether to speculatively execute ahead of each store operation and to determine whether to speculatively forward data from one of the store operations.

In Example 36, the subject matter of Example 35 can optionally include wherein the store address predictor comprises a store address table comprising entries for the store operations, each entry comprising an index associated with an instruction point (IP) of an associated store operation of the store operations, the predicted address for the associated store operation, an entry state for the entry, and a counter value for the entry. In Example 37, the subject matter of Examples 35-36 can optionally include wherein the store address predictor further comprises an address prediction component to generate the predicted addresses.

In Example 38, the subject matter of Examples 35-37 can optionally include further comprising generating, by the address prediction component, the predicted addresses based on stride calculations of the store operations. In Example 39, the subject matter of Examples 35-38 can optionally include wherein the store address predictor further comprises a threshold comparison component to determine, for each of the entries, whether the counter value exceeds a counter threshold has been reached by the counter value of the entry.

In Example 40, the subject matter of Examples 35-39 can optionally include further comprising, when the counter threshold has been reached, setting, by the address prediction component, the entry state of the entry to suppress use of the predicted address by the store buffer. In Example 41, the subject matter of Examples 35-40 can optionally include further comprising a load buffer for buffering the load operation, the load buffer comprising an entry for the load operation that comprises a store buffer ID field to store a store buffer ID of an entry of the store buffer corresponding to a store operation from which the load operation speculatively forwarded data. In Example 42, the subject matter of Examples 35-41 can optionally include wherein when a dispatched store operation of the store operations calculates a store address, overwriting the predicted address in the store buffer for the dispatched store operation with the calculated store address.

In Example 43, the subject matter of Examples 35-42 can optionally include further comprising verifying whether the predicted address and the calculated address match, wherein when the predicted address and the calculated address do not match, incrementing the counter value for the entry associated with the dispatched store operation. In Example 44, the subject matter of Examples 35-43 can optionally include wherein the load operation is indicated as mispredicted when at least one of the load operation speculatively executes ahead of the dispatched store operation without speculatively forwarding data from the dispatched store operation and comprises an address that matches the calculated address, the load operation speculatively forwarded the data from the dispatched store operation and the address of the load operation does not match the calculated address, or the load operation speculatively forwarded data from another store operation of the store operations and the address of the load operation matches the calculated address.

Example 45 is an apparatus for implementing store address prediction for memory disambiguation in a processing device comprising means for predicting, by a store address predictor of a processing device, an address for store operations that stores data to a memory hierarchy, means for allocating an entry in a store buffer for buffering the store operations prior to completion, the entry in the store buffer comprising the predicted address for each of the store operations, and means for referencing, by a load operation of the processing device, the predicted address in the store buffer to determine whether to speculatively execute ahead of each store operation and to determine whether to speculatively forward data from one of the store operations. In Example 46, the subject matter of Example 45 can optionally include the apparatus further configured to perform the method of any one of the Examples 14 to 23.

Example 46 is at least one machine readable medium comprising a plurality of instructions that in response to being executed on a computing device, cause the computing device to carry out a method according to any one of Examples 13-23. Example 47 is an apparatus for implementing store address prediction for memory disambiguation in a processing device configured to perform the method of any one of Examples 13-23. Example 48 is an apparatus for implementing store address prediction for memory disambiguation in a processing device comprising means for performing the method of any one of claims 13 to 23. Specifics in the Examples may be used anywhere in one or more embodiments.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device, comprising:
   a store address predictor to predict an address for store operations that store data to a memory hierarchy;
   a store buffer communicably coupled to the store address predictor, the store buffer to buffer the store operations prior to completion, the store buffer to comprise the predicted address for each of the store operations; and
   a load buffer communicably coupled to the store address predictor, the load buffer to buffer a load operation, the load operation to reference the store buffer to, based on the predicted addresses, determine whether to speculatively execute ahead of a respective store operation and to determine whether to speculatively forward data from the respective store operation.

2. The processing device of claim 1, wherein the store address predictor comprises a store address table comprising entries for the store operations, each entry comprising an index associated with an instruction point (IP) of an associated store operation of the store operations, the predicted address for the associated store operation, an entry state for the entry, and a counter value for the entry.

3. The processing device of claim 2, wherein the store address table is a content addressable memory (CAM) array and the index is the IP of the associated store operation.

4. The processing device of claim 1, wherein the store address predictor further comprises an address prediction component to generate the predicted addresses, wherein the address prediction component to generate the predicted addresses based on stride calculations of the store operations.

5. The processing device of claim 2, wherein the store address predictor further comprises a threshold comparison component to determine, for each of the entries, whether the counter value exceeds a counter threshold has been reached by the counter value of the entry, wherein when the counter threshold has been reached, the address prediction component to set the entry state of the entry to suppress use of the predicted address by the store buffer.

6. The processing device of claim 1, wherein the load buffer comprising an entry for the load operation that comprises a store buffer ID field to store a store buffer ID of an entry of the store buffer corresponding to a store operation from which the load operation speculatively forwarded data.

7. The processing device of claim 2, wherein when a dispatched store operation of the store operations calculates a store address, and wherein the store buffer to:
   overwrite the predicted address in the store buffer for the dispatched store operation with the calculated store address; and
   verify whether the predicted address and the calculated address match.

8. The processing device of claim 7, wherein when the predicted address and the calculated address do not match, the store address predictor to increment the counter value for the entry associated with the dispatched store operation.

9. The processing device of claim 6, wherein the load operation is indicated as mispredicted when at least one of:
   the load operation speculatively executes ahead of the dispatched store operation without speculatively forwarding data from the dispatched store operation and comprises an address that matches the calculated address;
   the load operation speculatively forwarded the data from the dispatched store operation and the address of the load operation does not match the calculated address; or
   the load operation speculatively forwarded data from another store operation of the store operations and the address of the load operation matches the calculated address.

10. A method, comprising:
    predicting, by a store address predictor of a processing device, an address for store operations that stores data to a memory hierarchy;
    allocating an entry in a store buffer for buffering the store operations prior to completion, the entry in the store buffer comprising the predicted address for each of the store operations; and
    referencing, by a load operation of the processing device, the predicted address in the store buffer to determine whether to speculatively execute ahead of each store operation and to determine whether to speculatively forward data from one of the store operations.

11. The method of claim 10, wherein the store address predictor comprises a store address table comprising entries for the store operations, each entry comprising an index associated with an instruction point (IP) of an associated store operation of the store operations, the predicted address for the associated store operation, an entry state for the entry, and a counter value for the entry.

12. The method of claim 10, wherein the store address predictor further comprises an address prediction component to generate the predicted addresses based on stride calculations of the store operations.

13. The method of claim 11, wherein the store address predictor further comprises a threshold comparison component to determine, for each of the entries, whether the counter value exceeds a counter threshold has been reached by the counter value of the entry, and wherein when the counter threshold has been reached, setting, by the address prediction component, the entry state of the entry to suppress use of the predicted address by the store buffer.

14. The method of claim 10, further comprising a load buffer for buffering the load operation, the load buffer comprising an entry for the load operation that comprises a store buffer ID field to store a store buffer ID of an entry of the store buffer corresponding to a store operation from which the load operation speculatively forwarded data.

15. The method of claim 14, wherein when a dispatched store operation of the store operations calculates a store address:
    overwriting the predicted address in the store buffer for the dispatched store operation with the calculated store address; and
    verifying whether the predicted address and the calculated address match, wherein when the predicted address and the calculated address do not match, incrementing the counter value for the entry associated with the dispatched store operation.

16. A system comprising:
a memory hierarchy; and
a processing device communicably coupled to the memory hierarchy, the processing device comprising an execution unit comprising:
- a store address predictor to predict an address for store operations that store data to the memory hierarchy;
- a store buffer for buffering the store operations prior to completion, the store buffer to comprise the predicted address for each of the store operations; and
- a load buffer communicably coupled to the store address predictor, the load buffer to buffer a load operation, the load operation to reference the store buffer to, based on the predicted addresses, determine whether to speculatively execute ahead of each store operation and to determine whether to speculatively forward data from one of the store operations.

17. The system of claim 16, wherein the store address predictor comprises a store address table comprising entries for the store operations, each entry comprising an index associated with an instruction point (IP) of an associated store operation of the store operations, the predicted address for the associated store operation, an entry state for the entry, and a counter value for the entry.

18. The system of claim 16, wherein the store address predictor further comprises an address prediction component to generate the predicted addresses based on stride calculations of the store operations.

19. The system of claim 17, wherein the store address predictor further comprises a threshold comparison component to determine, for each of the entries, whether the counter value exceeds a counter threshold has been reached by the counter value of the entry.

20. The system of claim 19, wherein when the counter threshold has been reached, the address prediction component to set the entry state of the entry to suppress use of the predicted address by the store buffer.

21. The system of claim 16, wherein the load buffer comprising an entry for the load operation that comprises a store buffer ID field to store a store buffer ID of an entry of the store buffer corresponding to a store operation from which the load operation speculatively forwarded data.

22. The system of claim 17, wherein when a dispatched store operation of the store operations calculates a store address, the store buffer to overwrite the predicted address in the store buffer for the dispatched store operation with the calculated store address.

23. The system of claim 22, wherein the store buffer to verify whether the predicted address and the calculated address match, and wherein when the predicted address and the calculated address do not match, the store address predictor to increment the counter value for the entry associated with the dispatched store operation.

24. The system of claim 23, wherein the load operation is indicated as mispredicted when at least one of:
- the load operation speculatively executes ahead of the dispatched store operation without speculatively forwarding data from the dispatched store operation and comprises an address that matches the calculated address;
- the load operation speculatively forwarded the data from the dispatched store operation and the address of the load operation does not match the calculated address; or
- the load operation speculatively forwarded data from another store operation of the store operations and the address of the load operation matches the calculated address.

* * * * *